UNITED STATES PATENT OFFICE.

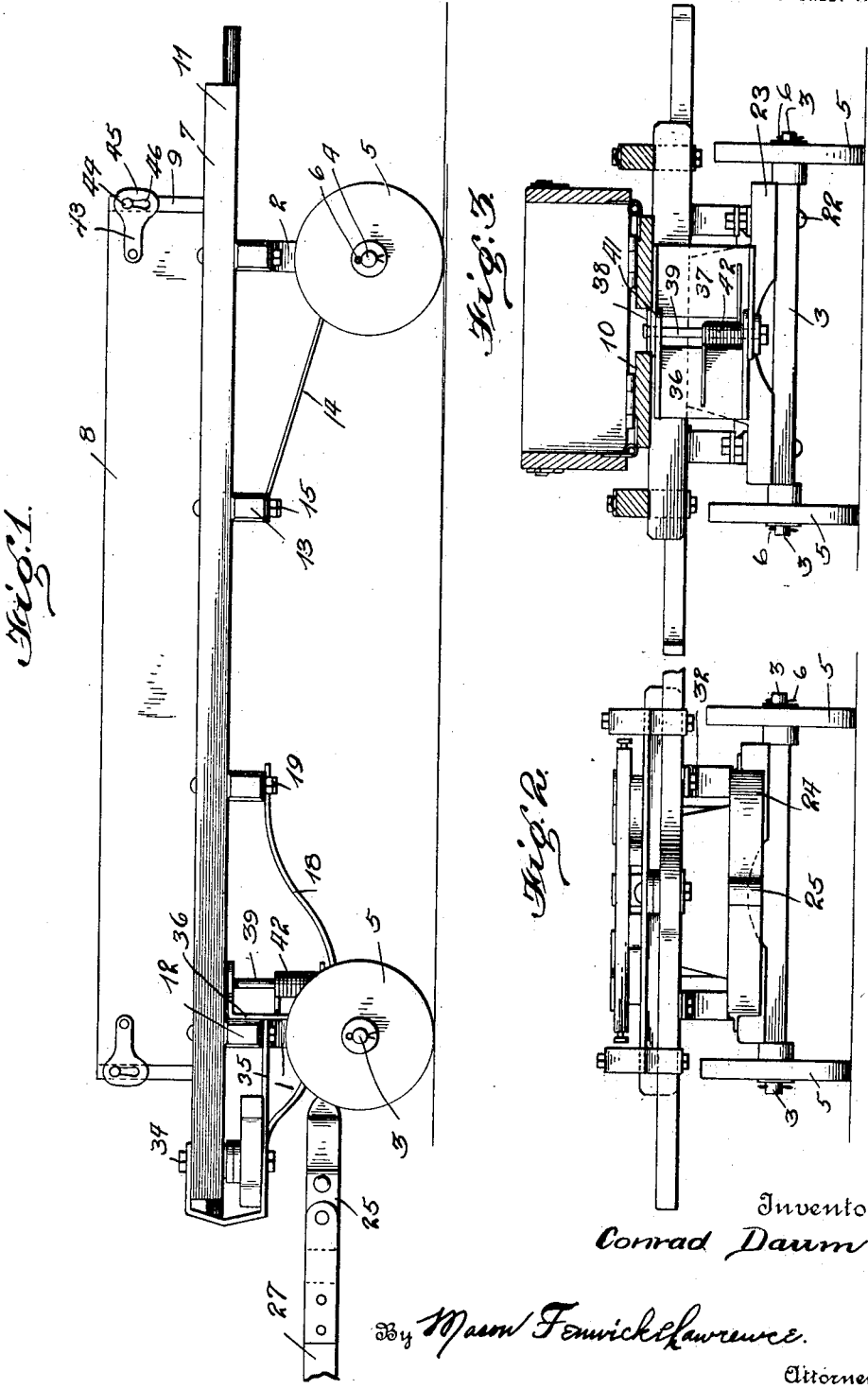

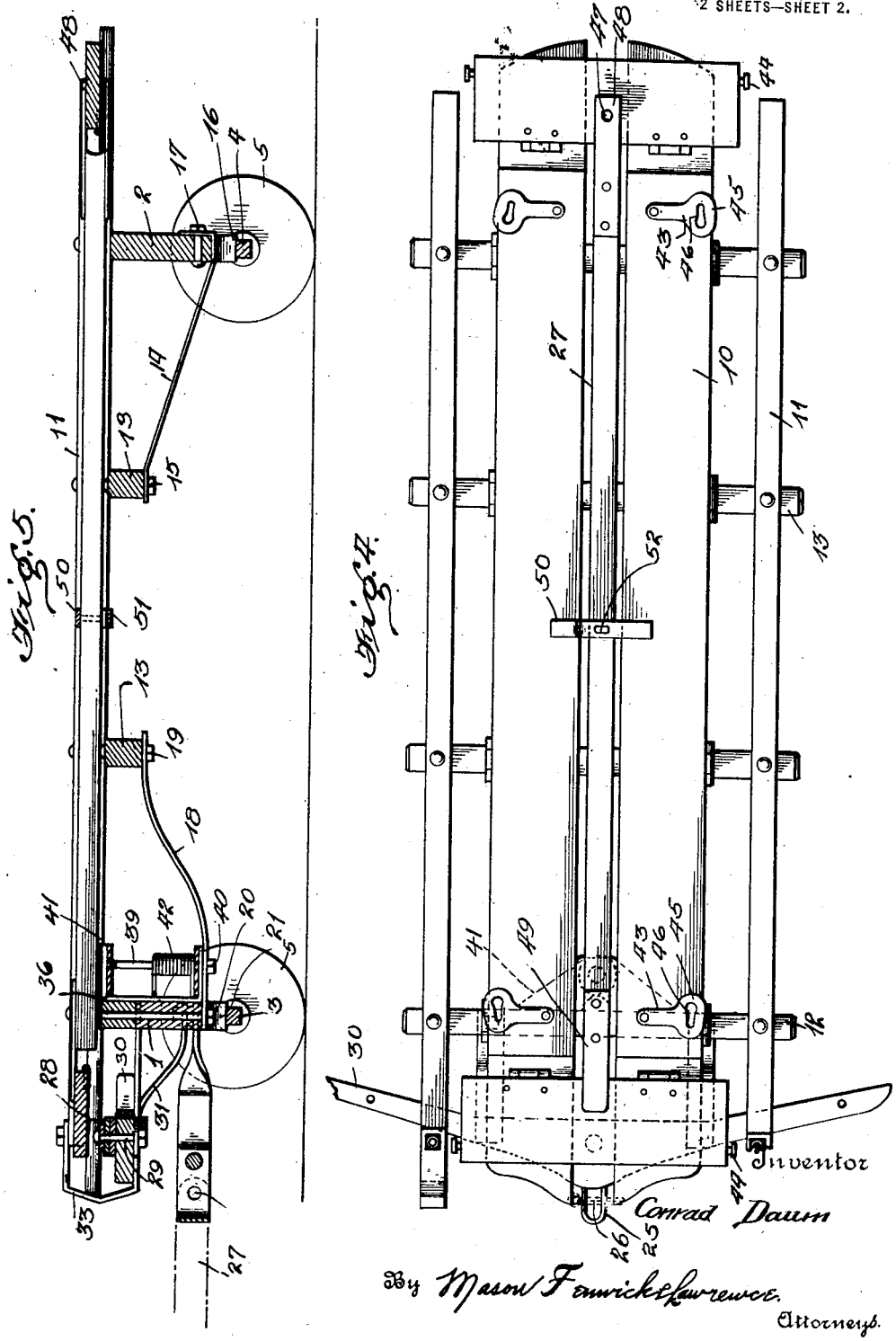

CONRAD DAUM, OF SCRANTON, PENNSYLVANIA.

AUTO ROLLER-SLEIGH AND EXPRESS-WAGON.

1,371,198.  Specification of Letters Patent.  Patented Mar. 8, 1921.

Application filed April 6, 1920. Serial No. 371,698.

*To all whom it may concern:*

Be it known that I, CONRAD DAUM, a citizen of the United States, residing at Scranton, in the county of Lackawanna and State of Pennsylvania, have invented certain new and useful Improvements in Auto Roller-Sleighs and Express-Wagons; and I do hereby declare the following to be a full, clear, and exact description of the invention, such as will enable others skilled in the art to which it appertains to make and use the same.

This invention relates to new and useful improvements in toy wagons and more particularly to what will be hereinafter known as an auto roller sleigh and express wagon, the main object of the present invention being the provision of a wagon of the above type, particularly adapted for use by youths, which can be used either as a roller coaster or converted for use as an express wagon.

Another object of the present invention is the provision of an express wagon provided with means for normally retaining the steering apparatus in a neutral position so that the front wheels will be normally retained in direct alinement with the rear wheels.

Another object of the invention is the provision of a coaster wagon having its sides and ends adapted to be folded onto the bottom of the body when it is desired to use the same as a coaster wagon and whereby these side and end pieces can be readily positioned to convert the coaster into an express wagon.

A further object of the invention is the provision of a convertible wagon wherein the side and end pieces are folded onto the bottom of the wagon when used as a coaster and the tongue of the wagon removed and positioned between the side portions and the end portions and provided with means for engaging the side portions to securely retain the several parts in position upon the bottom of the body when used as a coaster wagon.

A further object of the present invention is the provision of a coaster wagon having attached to the forward end of the body suitable guides for the steering device which not only support the ends of the steering bar but serve to guide the same in its movement so as to assure a true guiding movement of the front wheels of the wagon.

A still further object of the invention is the provision of a coaster wagon provided with suitable means for retaining the steering apparatus in a neutral position at all times and said means being so disposed as to provide additional bracing means for the front axle of the wagon.

With the above and other objects in view, the invention consists in the novel features and construction, the combination and arrangement of parts hereinafter more fully set forth, pointed out in the claims and shown in the accompanying drawings, in which—

Figure 1 is a side elevation of a convertible wagon constructed in accordance with my invention, Fig. 2 is a front end elevation, Fig. 3 is a transverse sectional view, Fig. 4 is a top plan view illustrating the side and end pieces as folded onto the bottom of the wagon and a tongue arranged in position to retain the side and end pieces in position on the wagon bottom, and Fig. 5 is a longitudinal sectional view.

In the construction of my improved wagon, I provide the front axle support 1 and the rear axle support 2. These supports have connected thereto the front axle 3 and the rear axle 4, each of said axles having mounted upon their outer ends suitable wheels 5. In the construction of these wheels, it is preferred to have them formed of aluminum or other light-weight material so as to reduce the weight of the entire wagon. The wheels are preferably mounted upon the ends of the axle and secured in position by cotter pins 6 or any other suitable form of fastening means. The body of the wagon which is mounted upon the axle supports 1 and 2 includes the bottom portion 7 having movable side walls 8 hingedly connected thereto and movable end walls 9 also hingedly connected to the bottom and adapted to be folded downwardly upon the bottom of the wagon or arranged in an upright position to form a suitable express body as illustrated in Fig. 1. The bottom 7 of the wagon includes the central portion which is formed of two parallel pieces 10 suitably spaced and arranged an equal distance upon each side of the center of the bottom. Side rails 11 are arranged at the outer edges of the bottom and disposed in spaced relation with the outer edges of the pieces 10. The bottom itself is supported at the rear end of the wagon upon the upper face of the axle support 2, while the forward end is supported upon a bearing member 12 arranged transversely of the bottom and mounted upon the forward axle support 1. The central portion of the body is further reinforced by the transverse member 13 arranged across the under side of the body end to which the several pieces forming the bottom of the body are secured.

In order to provide suitable means for bracing the front and rear axle supports, the rear axle is provided with a brace rod 14, one end of which is attached by means of a bolt 15 to one of the transverse members 13 while the other end of the rod extends through a cavity 16 in the rear axle support 2 and is then bent upon itself and secured to the rear face of the axle support 2 by means of the bolt 17. The forward axle support 1 is retained in an upright position by means of the brace rod 18, one end of which is attached to one of the cross member 13 by means of a bolt 19, while the other end is arranged within the cavity 20 formed on the under side of the support 1 and connected to the pivot bolt 21 which extends up through the axle support 1 and the transverse member 12 in order to provide a suitable pivotal mounting for the axle support 1 upon which the same swings for guiding the wagon.

In order to provide suitable guiding means for the device, suitable bolts 22 are extended up through the reduced end portions 23 of the forward axle support and having its ends attached to these bolts is the hound 24, the outer end of which is provided with a loop 25 having a cotter pin 26 extending therethrough for detachably connecting the tongue member 27 to the wagon when it is desired to use the same as an express wagon. Extending transversely across the lower face of the bottom of the body is a bar 28 the central portion of which supports the pivot pin 29 for the steering bar 30 and the steering bar 30 is suitably connected to the front axle support by means of the connecting rods 31, one end of each of said rods being loosely connected with the steering bar 30 upon opposite sides of the center thereof by means of the bolts 32 while the other ends are loosely connected with the bolts 22 on the front axle support, thus it will be noted that swinging movement imparted to the steering bar 30 will be conveyed to the front axle support to move the same in the direction in which it is desired to have the wagon travel.

The outer ends of the steering bar 30 are supported and guided by means of the U-shaped brackets 33, one end of each of said brackets extending beneath the bottom of the body of the wagon and connected to the transverse member 12 while the other end extends upon the top of the side rails 11 and is secured thereto by means of suitable bolts 34. Thus, it will be apparent that the longer end, generally indicated by the numeral 35, of each of the brackets 33 provides a suitable support and guide for the ends of the bar 30.

In order that the steering apparatus, which includes the front axle, the support therefor and the pivoted steering bar 30, may be normally retained in a neutral position, the spring-actuated bearing plates 36 and 37 are arranged in the rear of the forward axle support and adapted to normally bear against the same and as these plates are disposed transversely of the body of the wagon, they will have a tendency to retain the forward axle support in its normal position which is transversely of the body of the wagon so that the wheels which are carried by the forward axle can be readily turned from side to side through the medium of the steering bar 30 and returned to a neutral position in general alinement with the rear wheels carried by the rear axle 4.

In order to support the two plates 36 and 37 in position at the rear of the front axle support, a bearing plate 38 is secured to the upper face of the transverse member 12 and extends rearwardly between the two central pieces 10 of the bottom and provided with a perforation to receive the pivot bolt 39. The lower end of this pivot bolt 39 extends through an opening in the brace rod 18 and has a nut 40 secured thereon whereby to retain the bolt in place after being positioned within the plate 38 and the brace rod 18. The bearing plates 36 and 37 are substantially U-shaped in form and provided with tapering side walls, the inner ends of which project beyond the intermediate portion of the body to form the perforated ears 41 which are pivotally mounted upon the bolt 39 to provide for a swinging movement of the two plates with respect to the pivot.

It will be noted that in arranging the plates 36 and 37 upon the pivot bolt, they are arranged in opposed relation with respect to one another and are adapted to normally bear against the inner side of the forward axle support and the front transverse member 12, it being understood that the front transverse member 12 will limit the pivotal movement of these plates in one direction so as to normally retain them into bearing engagement with the rear face of the forward axle support. In order to retain the plates in their normal positions bearing against the rear face of the axle support and the transverse member 12, a coil spring 42 is mounted upon the bolt 39 and having its ends disposed in opposite directions and adapted to bear against the two plates 36 and 37, the tension of the spring retaining the plates in contact with the forward axle support and the transverse member 12.

From the above description, taken in connection with the illustration in the accompanying drawings, with respect to these two plates, it will be apparent that when the steering bar 30 is actuated to impart a turning movement to the axle support 1, the movement of the axle support will tend to swing either one of the plates 36 and 37 away from its normal position while the remaining plate will be retained in its normal position by having the same resting against the rear face of the transverse member 12. As soon as the steering bar 30 is released, the tension of the spring 42 will return the plate, which has been previously swung from its normal position, to its normal position, said plate forcing the axle support back to a neutral position so that the wheels thereof are disposed in alinement with the rear wheels on the axle support 2. From this, it will be apparent that the front wheels of the wagon will be retained at all times in a normal or neutral position and the same can be readily swung from one side to the other through the medium of the steering bar 30 and upon releasing the steering bar will be returned to their neutral position through the bearing of the spring 39 upon the plates 36 and 37.

In Fig. 4, I have illustrated the device arranged for use as a coaster wagon and in order to convert the same into an express body, the two side portions 8 are folded outwardly and disposed in a substantially vertical position as illustrated in Fig. 1. The end portions 9 are then folded upwardly against the ends of the side portions 8 and suitably retained in position by means of the catch members 43 which engage the headed pins 44, it being understood that the catch members 43 are carried by the side walls 8 while the headed pins are secured to the ends of the end pieces 9. The catch members 43 are in the form of an elongated plate provided with a transverse head 45 having a slot 46 therein, one end of said slot being substantially reduced to receive the body portion of the pin 44 so that the head of the pin will engage the head of the catch to retain the catch in a locked position. In placing each one of these catch members in position so as to lock the side and end walls together, the headed pin 44 is projected through the enlarged end of the slot 46 and the transverse head 45 of the catch is then pressed downwardly until the pin 44 is moved into the reduced end of the slot 46 so that the head of the pin engages with the outer face of the catch 43 to retain the same in a locked position. These catch members 43 or locking plates are arranged at each end of the side walls 8 and are adapted to engage with the pins 44 which are extended from each end of the end pieces 9 at a point adjacent the upper longitudinal edges thereof. From this, it will be apparent that the side and end walls can be readily moved to an upright position and securely held in this position so as to form a suitable express body for the wagon.

When the wagon is converted for use as an express wagon and the body provided with an express body through arrangement of the side and end walls 8 and 9, the tongue member 27 is removed from its position shown in Fig. 4 and connected to the loop 25 of the hound 24 by having the spaced plates 47, which are secured to one end of the tongue, disposed upon opposite sides of the loop 25 and secured thereto by inserting the pin 26 through the loop and through the openings 48 formed in the ends of the plates 47, thus securing the tongue 27 to the hound of the wagon whereby the wagon will be converted into an express wagon as shown in Fig. 1.

It will be noted that when the side walls 8 are folded into position onto the bottom of the body of the wagon, the space between the inner longitudinal edges of the side walls corresponds to a certain degree with the space between the bottom boards 10 of the bottom, thus leaving a suitable space for the reception of the tongue 27 when the device is converted into a coaster wagon and in Fig. 4 it will be noted that the tongue 27 is arranged in position between the inner longitudinal edges of the bottom boards 10 and the side walls 8. In order to retain the tongue 27 in position when not in use, the two plates 47 at the inner end of the tongue are engaged upon opposite sides of the rear end wall, while the forward end of the tongue is supported by a plate 49, one end of which is attached to the tongue while the other end thereof projects beyond the end of the tongue and rests upon the forward end wall whereby to support the forward end of the tongue in general alinement with the rear end.

In order that the tongue 27 may be securely retained in position between the side walls 8 and the bottom boards 10, I provide two pivoted latch members 50 and 51 which are pivotally mounted upon the tongue 27 and normally arranged in alinement with the tongue when the same is in use at the forward end of the wagon, but when the tongue is in the position illustrated in Fig. 4, these latch members 50 and 51 are swung to a position transversely of the tongue and adapted for engagement with the side walls 8 and the bottom boards 10 to retain the tongue in position between the longitudinal edges of the side walls 8 and the bottom boards 10. The latch members 50 and 51 are connected to the central portion of the tongue 27 by means of the pivot pin 52 and when the tongue is in use at the forward end of the wagon, these latch plates will be disposed in parallel relation with the body of the tongue and when the tongue is arranged in position between the folded side walls 8 and the bottom members 10, they will be swung to a transverse position so that the ends will be engaged with the side walls and the bottom members 10 to securely retain the tongue in position.

From the above description, taken in connection with the accompanying drawings, it will be readily apparent that I have provided a simple and durable wagon for use by youths and which can either be used as a coaster wagon or readily converted into an express wagon. When the wagon is used as a coaster, the side and end walls of the express body are folded downwardly onto the bottom of the wagon and retained in this position by having the tongue arranged between the side walls and the plates on the end of the tongue engaging with the walls while the pivoted latch members 50 and 51 are engaged with the side walls and bottom of the wagon and thus retain the several parts in their folded positions. When it is desired to convert the wagon into an express wagon, the tongue is removed by swinging the latch plates in parallel arrangement with the tongue and the tongue is then attached to the hound 24, the side and walls being then swung to an upright position and securely retained in this position by having the catch members 43 engaged with the headed pins 44. Particular attention is directed to the means for normally retaining the forward axle support in its normal or neutral position, this means including the two pivoted plates 36 and 37 which bear against the rear face of the axle support and are securely retained in a transversely alined position by means of the coil spring 42, the transverse member 12 forming a stop for the two plates so that they will not swing beyond their transversely alined positions.

What I claim is:

1. A wagon of the class described including a body having a transverse bearing member, an axle support, a bolt pivotally connecting said bearing member and axle support, spring-actuated plates mounted for pivotal movement upon the body and adapted to normally engage the bearing member and the axle support, said plates being actuated independently whereby to return the axle support to a transverse alinement with the bearing member when the same is moved at an angle with respect to the bearing member.

2. A wagon of the class described including a body, an axle support normally disposed transversely of the body, a steering bar arranged adjacent the axle support and pivotally supported from the body, means for connecting the steering bar with the axle support, and spring-actuated plates carried by the body and normally bearing against the axle support to retain the same in its normal position.

3. A device of the class described including a body, a transverse bearing member at one end thereof, an axle support pivotally connected with the bearing member, and spring pressed plates carried by the body of the wagon for normally engaging the bearing member and the axle support to retain the axle support in transverse alinement with the bearing member.

4. A wagon of the class described including a pivotally mounted axle support, a steering bar arranged at one side of the axle support and mounted for pivotal movement, means for connecting the steering bar to the axle support whereby movement imparted to the steering bar will actuate the axle support from its normal position transversely of the body of the wagon, and spring pressed plates carried by the body engaging the axle support for returning the same to its normal position after being moved therefrom.

5. A wagon of the class described including a bearing member and a pivoted axle support, a steering bar pivotally connected to the body, means for connecting the steering bar with the axle support, U-shaped guide members having their ends connected with the body, one end of each of said guide members being extended beyond the other end and secured to the bearing member whereby to support and guide the ends of the steering bar.

6. A wagon of the class described including a body member, a transverse bearing member, an axle support pivotally connected with the bearing member, substantially U-shaped plates, perforated ears formed on each of said plates at one end thereof, a pivot pin extending through said ears, a spring carried by the pivot and having its ends engaged with the plates for retaining the axle support in its normal position in alinement with the bearing member.

In testimony whereof I affix my signature.

CONRAD DAUM.